United States Patent [19]
Bonacci

[11] Patent Number: 5,232,250
[45] Date of Patent: Aug. 3, 1993

[54] ADJUSTABLE FLANGE FOR PLUMBING FIXTURES

[76] Inventor: Anthony S. Bonacci, 217 Fifth Ave., West Mifflin, Pa. 15122

[21] Appl. No.: 824,426

[22] Filed: Jan. 23, 1992

[51] Int. Cl.⁵ ........................................ F16L 55/172
[52] U.S. Cl. .................................. 285/56; 285/236; 285/912; 24/269
[58] Field of Search .................. 285/56–60, 285/236, 252, 253, 414, 420, 912, 15; 24/20 LS, 269, 274 R, 274 WB, 275, 276, 278, 279, 280

[56] References Cited

U.S. PATENT DOCUMENTS

| | | | |
|---|---|---|---|
| 1,490,618 | 4/1924 | McKinney | 24/269 |
| 2,958,549 | 11/1960 | Spafford | 285/25 LX |
| 3,921,229 | 11/1975 | Yavitch . | |
| 4,052,759 | 10/1977 | Hill . | |
| 4,207,630 | 6/1980 | Bressler . | |
| 4,227,722 | 10/1980 | Barber . | |
| 4,398,566 | 8/1983 | Janzen | 24/269 X |
| 4,470,162 | 9/1984 | Marshall . | |
| 4,502,166 | 3/1985 | Brown, Sr. . | |
| 4,827,539 | 5/1989 | Kiziah . | |
| 4,886,302 | 12/1989 | Forbes . | |
| 4,918,761 | 4/1990 | Harbeke . | |
| 4,919,374 | 4/1990 | Julian | 24/269 X |
| 4,984,308 | 1/1991 | Handal | 285/56 X |
| 5,018,224 | 5/1991 | Hodges . | |

FOREIGN PATENT DOCUMENTS

| | | | |
|---|---|---|---|
| 63934 | 8/1968 | Fed. Rep. of Germany | 24/269 |
| 522194 | 5/1957 | Italy | 285/912 |

OTHER PUBLICATIONS

Jones Mfg. Co. catalog.
Branson, *Remodelling Your Basement*, Betterway Publications, Inc., 1990, pp. 77-80.

Primary Examiner—Dave W. Arola
Attorney, Agent, or Firm—Kirkpatrick & Lockhart

[57] ABSTRACT

An adjustable flange comprises a circular collar portion having a base. The collar defines first and second openings therethrough. A gasket extends from the base and defines an opening coextensive with the first opening. The gasket is sized to fit around the circumference of a pipe. An adjusting means has a first portion for encircling the gasket for applying compressive forces thereto and a second portion extending along the gasket and through the second opening. The first and second portions cooperate such that upon rotation of the second portion, the forces applied by the first portion are varied.

12 Claims, 3 Drawing Sheets

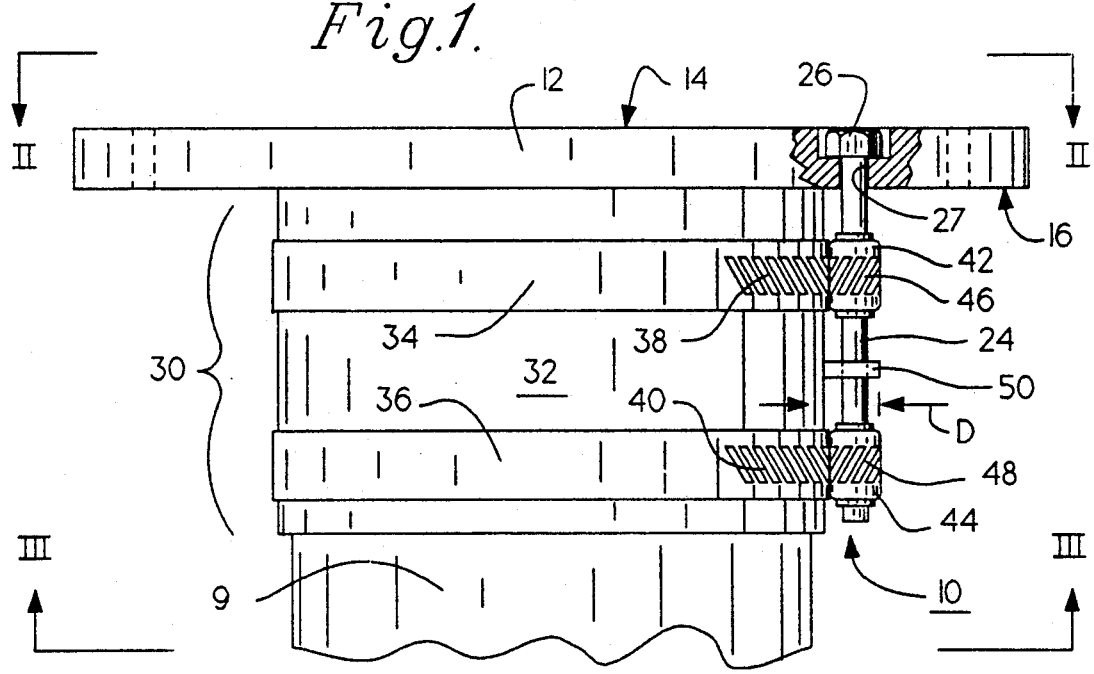
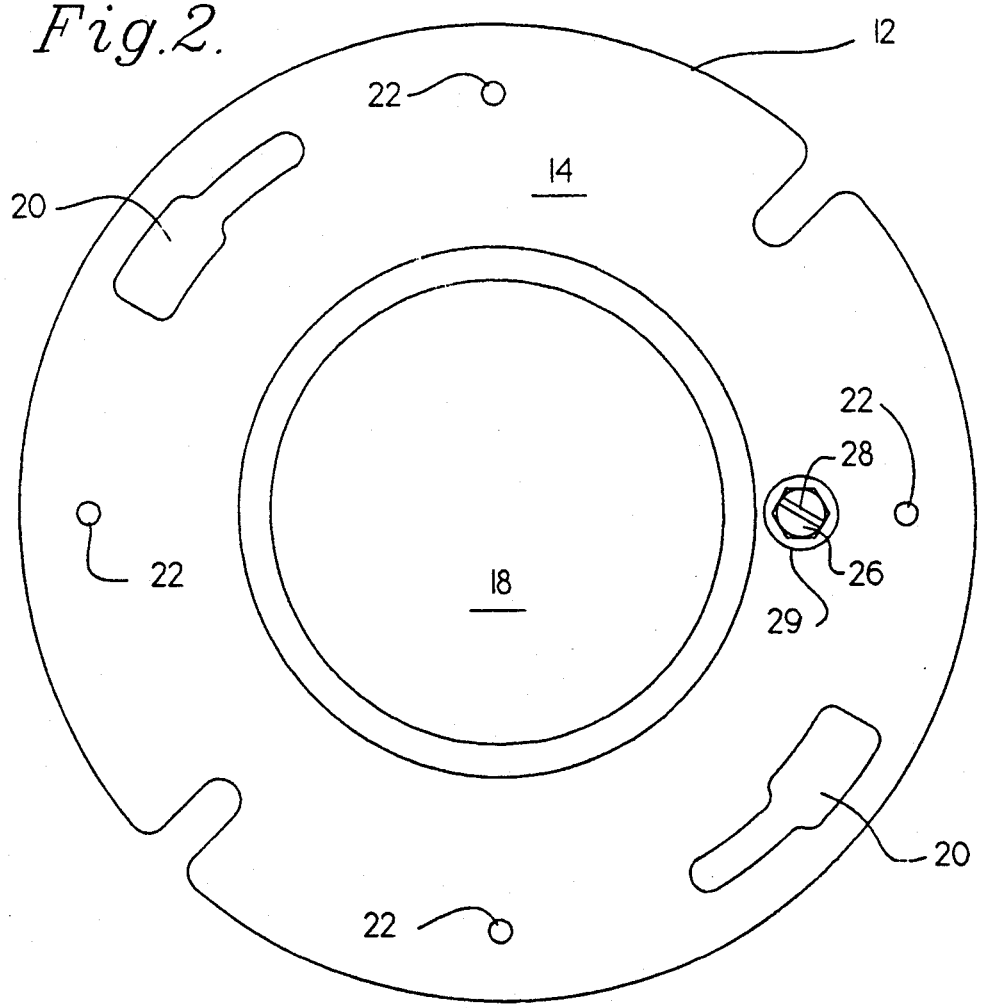

ADJUSTABLE FLANGE FOR PLUMBING FIXTURES

BACKGROUND OF THE INVENTION

1. Field of the Invention

The present invention relates to a flange for coupling pipes, and more particularly, to an adjustable flange for coupling pipes to plumbing fixtures.

2. Description of the Background of the Invention

While the present invention has a broad range of applications, by way of example only, the invention will be described herein as it may be used with plumbing fixtures, especially water closets.

Plumbing fixtures in some buildings, particularly older structures, are typically attached to the drain pipes using cast iron flanges and fittings. In the case of a flange used to attach a water closet to a drain pipe, that flange is typically made of cast iron and has an opening which loosely fits around the drain pipe. The thickness of such cast iron flanges as measured by the difference between an inner diameter and an outer diameter is typically one-quarter inch (0.635 cm). An additional one-quarter inch clearance is typically provided between the inner diameter of the flange and the outer diameter of the pipe around which such flange will be attached. Thus, there is often little more than a one half inch (1.27 cm.) diameter clearance in which to work.

When attaching the cast iron flange to the drain pipe, the clearance between the inner diameter of the flange and the outer diameter of the pipe is packed tightly with a tar-soaked hemp or jute fiber known as oakum. Thereafter, lead is melted and poured into the joint over the oakum, covering the area between the flange and the drain pipe over the oakum to seal the joint between that flange and the drain pipe. The water closet may then be bolted onto the flange using standard techniques known in the art.

In repairing or replacing such plumbing fixtures, the cast iron flange typically needs to be replaced. Removing the flange is a difficult procedure in that the lead has to be drilled out, often fracturing the cast iron flange or drain pipe in the process.

Once the old flange has been removed, the above-described method of using oakum and lead may be used to attach the new flange. That, too, is a relatively difficult, long and tedious procedure involving a great deal of expense in terms of both time and material. That procedure, if done skillfully, does generally provide a good seal between the flange and the drain pipe. As the cast iron tends to fracture easily, it is possible that the flange will break when it is being installed, thereby creating the need to reiterate the entire process. Furthermore, such cast iron flanges tend to be expensive compared to those made of formed plastic which are typically used in newer construction. Because of the use of hot molten lead, that procedure is potentially hazardous. Finally, such use of lead is discouraged because of its potential harmful effects on health.

As such, a method for repairing a water closet anchoring to a fractured closet flange and a spanner clamp therefore have been developed which consists of using a two piece spanner clamp secured with fasteners. Such a method is described in U.S. Pat. No. 4,502,166 to Bressler. However, use of the Bressler method still poses some problems. For example, because of the clearance around the drain pipe required to install the spanner clamp and fasteners, the floor surrounding the drain pipe will normally need to be cut out to accommodate the size and the placement of the fasteners. Furthermore, the device itself makes a relatively poor seal with the drain pipe compared to the seal created by the oakum and lead combination.

Thus, the need exists for a replacement flange which will overcome the aforementioned problems. Such a replacement flange must be inexpensive, easy to install and remove, and above all, provide an effective and reliable seal between the flange and the drain pipe. Furthermore, such a flange must conform to existing size standards for plumbing fixtures to avoid costly structural modifications and, finally, such a flange should be adjustable from only one side of the joint.

SUMMARY OF THE PRESENT INVENTION

In accordance with the present invention, an adjustable flange is provided for coupling a water closet to a drain pipe. The adjustable flange comprises a circular collar portion having a base, wherein the collar defines first and second openings therethrough. A gasket extends from the base, wherein the gasket defines an opening coextensive with the first opening in the collar, and wherein the gasket is sized to fit around the circumference of a pipe. The adjustable flange further comprises adjusting means having a first portion for encircling the gasket for applying compressive forces thereto and a second portion extending along the gasket and through the second opening; and wherein the first and second portions cooperate such that upon rotation of the second portion, the forces applied by the first portion are varied. In one embodiment of the invention, the first portion of the adjusting means comprises a band having equally spaced slots through a portion thereof and the second portion of the adjusting means includes a member having teeth adapted to drivingly engage the slots. According to another embodiment of the invention, the adjusting means comprises a band having a first gear attached thereto and the second portion of the adjusting means includes a second gear for drivingly engaging the first gear. According to yet another embodiment of the invention, the adjusting means comprises a band having an end and the second portion of the adjusting means includes a spool means adapted for wrapping the end thereon. In each of those embodiments, the second portion may be adapted to be rotated by a torque-limiting wrench, or alternatively, the second portion may be adapted to be rotated by a screwdriver.

Accordingly, the present invention provides solutions to the foregoing problems. The present invention provides an adjustable flange which may be used in repairing and replacing existing plumbing fixtures. The present invention is inexpensive to manufacture. Installation and removal are easily accomplished as the adjustable flange of the present invention may simply be placed around the existing drain pipe and tightened with a torque wrench or screwdriver. Furthermore, when properly tightened, the flange provides an effective seal with the drain pipe. The present invention conforms to existing size standards for plumbing fixtures and thus costly structural modifications are avoided. Finally, the flange may be easily and accurately tightened from one side of the joint, therefore access is not a problem.

BRIEF DESCRIPTION OF THE DRAWINGS

For the present invention to be clearly understood and readily practiced, a preferred embodiment will now be described, by way of example only, wherein:

FIG. 1 is an elevational view of the adjustable flange of the present invention;

FIG. 2 is a top view of the adjustable flange along line II—II of FIG. 1;

DETAILED DESCRIPTION OF A PREFERRED EMBODIMENT

Figure 3:
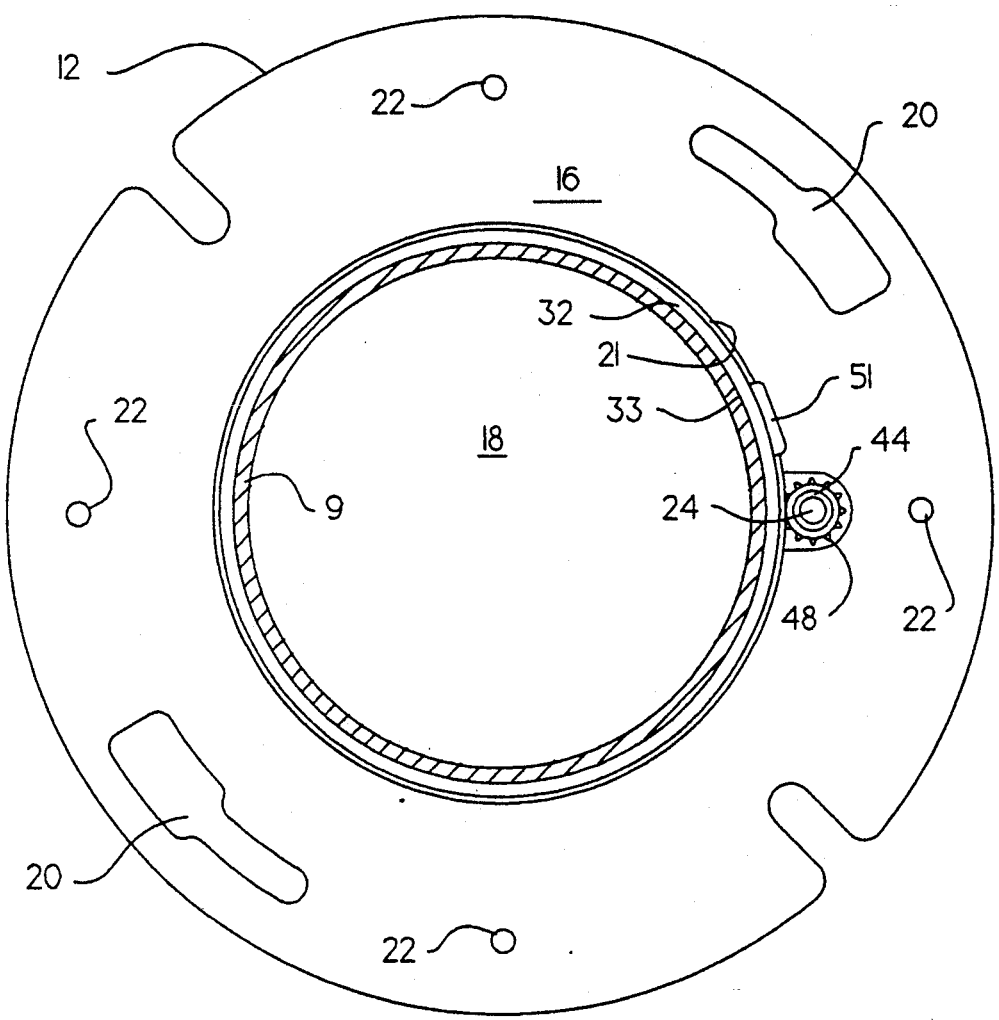
FIG. 3 is a bottom view of the adjustable flange along line III—III of FIG. 1.

With reference to FIG. 1, there is shown an adjustable closet flange, generally referred to as 10, constructed according to the teachings of the present invention. While the present invention will be described as an adjustable closet flange for coupling a water closet, or commode, to a drain pipe, such application is for illustrative purposes only and is not intended to so limit the scope of the invention.

More particularly, FIG. 1 shows a flange 10 comprising a collar 12 and a coupling portion 30 which couples the flange 10 to a drain pipe 9. As illustrated in FIG. 2, the collar 12 has a generally circular shape and defines an opening 18 in the center thereof. The opening 18 may be of a generally conical shape. Typically, such openings 18 are about four inches (10.16 cm.) in diameter at a top 14 of the collar 12 and three inches (7.62 cm.) in diameter at a base 16 of the collar 12.

The collar 12 is similar, but not identical, to the collar portion of a standard closet flange as known in the art. That is, the collar 12 is of a similar shape and has all of the cutouts of the standard closet flange. Such a standard closet flange is manufactured by NIBCO, Part No. ABS-I 4x3, No. 5851. The collar 12 has two slots 20 through which bolts (not shown) may be passed for attachment to the water closet (not shown). The collar 12 also has four holes 22 through which bolts (not shown) may be passed for securing the flange 10 to the floor (not shown). I prefer that the collar 12 be made of ABS or PVC or any other type of hard synthetic plastic common in the industry.

The collar 12 differs from that of the standard closet flange in that the collar 12 has an additional aperture 27 passing therethrough from the top 14 to the base 16. The top 14 also has a cutout area 29 around the aperture 27 sized for receiving a torque wrench for countersinking the head 26 of a bolt 24.

Referring again to FIG. 1, the coupling portion 30 is made up of a circular gasket 32 and bands 34, 36. The gasket 32 may be made of neoprene or any other durable synthetic rubber. Generally, I prefer that the thickness of the gasket 32 be about one-eighth of an inch (0.32 cm.) and the height of the gasket 32 to be about four inches (10.16 cm.). The outer diameter of the gasket 32 is smaller than the outer diameter of the collar 12, as seen in FIG. 3. The gasket 32 may be attached or secured to the collar 12 in any of several different ways.

For example, the collar 12 may be fused or molded to the gasket 32 during manufacture, or the gasket 32 may simply be glued to the collar 12 during manufacture. If the gasket 32 is glued to the collar 12, I prefer that the base 16 of the collar 12 have a circular groove 21 (shown in FIG. 3) cut therein for receiving and supporting the gasket 32.

When the gasket 12 is connected to the base 16, the inside 33 of the gasket 32 forms an extension of the opening 18. The inner diameter of the gasket 32 is such that the gasket 32 may fit around a drain pipe 9. As such, the opening 18 is in fluid communication with the interior of the drain pipe 9. To facilitate a better seal, the gasket 32 should generally fit tightly around the drain pipe 9. The pipe 9 preferably should extend through the gasket 32 to a point at or near the base 16.

Figure 4:
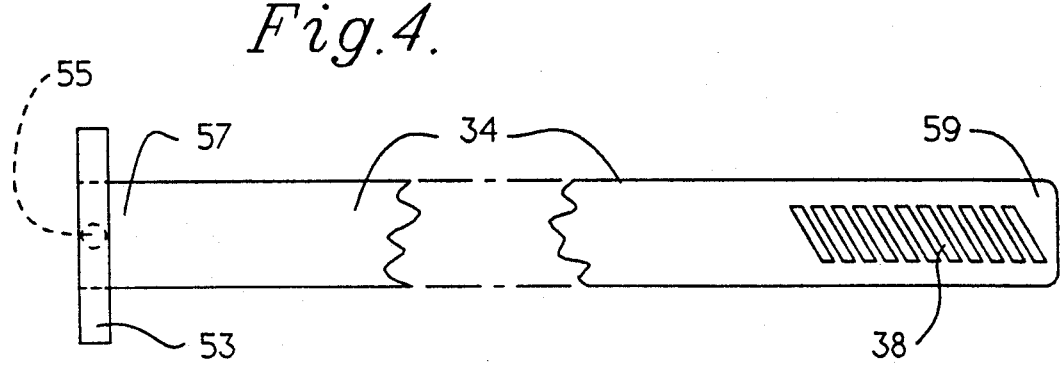
FIG. 4 is a side elevational view of the top band shown in FIG. 1.

To obtain a tighter fit and therefore a better seal, the gasket 32 is adjustable by means of the bands 34, 36 and adjusting bolt 24. As illustrated in FIGS. 1 and 4, the bands 34, 36 may be flat stainless steel and may, for example, be about one-half inch (1.27 cm.) wide. In a preferred embodiment, each band 34, 36 may have diagonally oriented slots 38, 40, respectively, through a portion thereof. With reference to FIG. 4, the slots 38 may be oriented, for example, at between thirty and forty-five degrees offset from the vertical axis, preferably evenly spaced and extending two to three inches from a first end 59 of the band 34. The slots 40 on band 36 are similarly oriented and preferably evenly spaced and also extending two to three inches from a first end (not shown) of the band 36.

The upper band 34 encircles the gasket 32 at a position near the base 16, while the lower band 36 encircles the gasket 32 at the end opposite the base 16. The second end 57 of the upper band 34 is fixed relative to the gasket 32 using a rivet 55. A loop 53 may be provided for adjustably attaching the first end 59 of the upper band 34 to the second end 57 of the upper band 34. The loop 53 is fixed near the second end 57 of the upper band 34 and has an area (not shown) through which the first end 59 of the upper band 34 may pass. Similarly, a second end (not shown) of the lower band 36 is fixed relative to the gasket 32 using a rivet (not shown). The first end (not shown) of the lower band 36 may be adjustably attached to the second end (not shown) of the lower band 36 using a loop 51. The loop 51 is fixed near the second end of the lower band 36 and has an area (not shown) through which the first end of the lower band 36 may pass.

The adjusting bolt 24 extends through the aperture 27 in the collar 12. The head 26 of the adjusting bolt 24 is preferably adapted to be engaged by a standard torque wrench. A slot 28 for receiving a straight blade screwdriver may also be provided. The adjusting bolt 24 has an upper adapter 42 and lower adapter 44 fixedly attached thereto. The upper adapter 42 and lower adapter 44 support teeth 46, 48, respectively, protruding axially therefrom. The teeth 46, 48 are diagonally oriented from the vertical to engage the slots 38, 40 of the bands 34, 36, respectively. A spacer 50 may be provided on the gasket 32 for further support of the adjusting bolt 24.

The distance D from the interior wall of the gasket 32 to the outboard teeth 46, 48, should be such that the entire assembly fits into the opening normally allocated for the installation of the closet flange. For example, if that width is at least one-half inch (1.27 cm.) and the gasket 32 has a thickness of one-eighth inch (0.3175 cm.), then the combined width of adjusting bolt 24, adapters 42, 44 and teeth 46, 48 may be up to three-eights of an inch (0.9525 cm) in diameter. Other sizes are contemplated, but the actual size is dependent upon the application.

With reference to FIGS. 1 and 2, the head 26 of the adjusting bolt 24 may be turned clockwise with a torque wrench, ratchet, screwdriver, or other means for turning. The corresponding clockwise rotation of the adjusting bolt 24 and the adapters 42, 44 cause the teeth 46, 48 to rotatably engage the cooperating slots 38, 40. The first end 59, (not shown) of the bands 34, 36, respectively, move relative to the fixed second ends 57, (not shown) of the bands 34, 36, respectively, thereby causing the bands 34, 36 to tighten around the gasket 32. This in turn compresses the gasket 32 about the drain pipe 9. The bands 34, 36 may be tightened in that manner until the bands 34, 36 fit tightly about the drain pipe 9. If using a properly set torque wrench, the wrench will disengage when the bands 34, 36 are sufficiently tightened. Use of a torque wrench will reduce the risk of fracturing a cast iron drain pipe 9.

By turning the head 26 of the adjusting bolt 24 counterclockwise, the bands 34, 36 may be loosened, thereby loosening the gasket 32 about the drain pipe 9. In so doing, the teeth 46, 48 rotate counterclockwise and drivingly engage the slots 38, 40 in the opposite direction. The first ends 59, (not shown) of the bands 34, 36, respectively, move relative to the fixed second ends 57, (not shown) of the bands 34, 36, respectively, thereby loosening the bands 34, 36.

Figure 5:
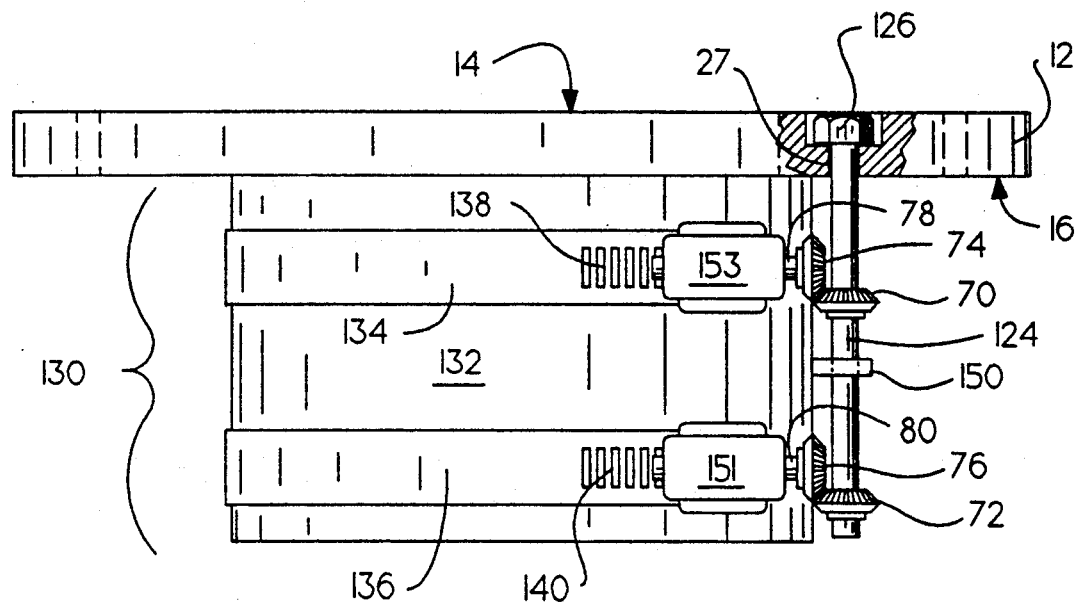
FIG. 5 is an elevational view of an embodiment of the present invention utilizing a beveled gear and pinion.

FIG. 5 shows another embodiment of the present invention. In that embodiment, the coupling portion 130 comprises a gasket 132 and bands 134, 136. The gasket 132 is similar to gasket 32. The bands 134, 136 are similar to bands 34, 36 except that the bands 134, 136 have vertically oriented slots 138, 140 respectively, which are drivingly engaged by screws 78, 80 respectively, held by anchors 151, 153, respectively. Each screw and anchor combination, 78, 151 and 80, 153 may be identical to that currently used for fasteners in no-hub joints, such a fastener being manufactured by Jones, No. BS-5087.

A gear 74 is fixed to the end of the screw 78 and a gear 76 is fixed to the end of the screw 80. Each of the gears 74, 76 are drivingly engaged by gears 70 and 72, respectively, which are fixed to the adjusting bolt 124. The adjusting bolt 124 passes through the aperture 27 in the collar 12 in a manner similar to that described above for adjusting bolt 24. A spacer 150 may be attached to the gasket 132 for supporting the adjusting bolt 124.

The head 126 of the adjusting bolt 124 may be turned clockwise with a torque wrench, ratchet, screwdriver, or other means for turning. The corresponding clockwise rotation of the adjusting bolt 124 and the gears 70, 72 cause the gears 74, 76, respectively, to rotate the screws 78, 80, respectively. That rotation adjusts the bands 134, 136 accordingly. If the screws 78, 80 have left-hand threads, then turning the head 126 of the adjusting bolt 124 clockwise will tighten the bands 134, 136 about the gasket 132 and the drain pipe 9. If screws 78, 80 have right-hand threads, then the head 126 of the bolt 124 must be turned counterclockwise to tighten the bands 134, 136 about the gasket 132 and the drain pipe 9. Again, the use of a torque wrench will reduce the risk of fracturing a cast iron drain pipe 9.

Figure 6:
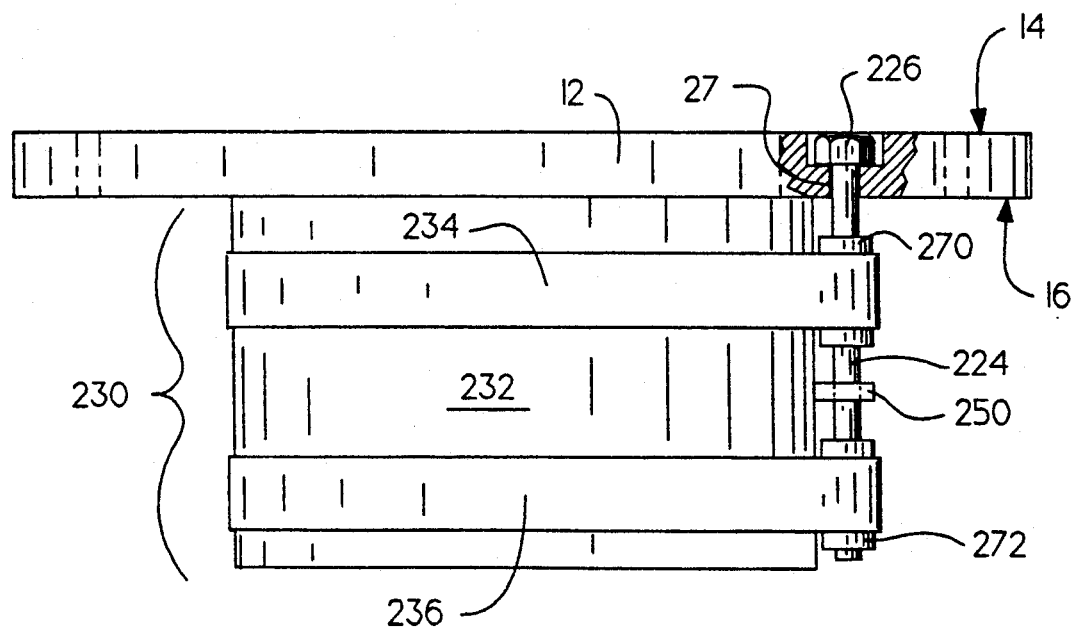
FIG. 6 is an elevational view of an alternative embodiment of the present invention utilizing a band and spool.

Still another embodiment is illustrated in FIG. 6. In that embodiment, the coupling portion 230 is comprised of a gasket 232 and two bands 234, 236. The gasket 232 is similar to the gasket 32 described hereinabove. The bands may be generally flat stainless steel and could, for example, be about one-half inch (1.27 cm.) wide.

The adjusting bolt 224 has mechanical spools 270, 272 fixedly attached thereto. A first end (not shown) of the bands 234, 236 is attached to the gasket 232 using a rivet (not shown). A second end of the bands 234, 236 is wrapped around the mechanical spools 270, 272. The adjusting bolt 224 passes through aperture 27 in a similar manner as described above for adjusting bolt 24. A spacer 250 may be used to support the adjusting bolt 224.

The head 226 of the adjusting bolt 224 may be turned clockwise with a torque wrench, ratchet, screwdriver, or other means for turning. The corresponding clockwise rotation of the adjusting bolt 224 and the spools 270, 272 cause the second ends of the bands 234, 236 to wrap about the spools 270, 272, respectively, thereby tightening the bands 234, 236 about the gasket 232 and the drain pipe 9. Similarly, by turning the head 226 of the adjusting bolt counterclockwise, the second end of the bands 234, 236 will unwrap from the spools 270, 272, thereby loosening the bands 234, 236 about the gasket 232 and drain pipe 9.

It will be understood that variations and changes in the details of the apparatus which has been herein described and illustrated to explain the present invention may be made by those skilled in the art without departing from the spirit, principle, and scope of the present invention. For example, the interior of the gasket 32 may be ribbed to create a better seal in connection with the drain pipe 9. The exterior of the gasket 32 may also have grooves (not shown) cut therein for receiving the bands 34, 36, thereby keeping the bands 34, 36 flush with the exterior of the gasket 32. Cross slots (not shown) for receiving a phillips head screwdriver may be provided in the head 26 of the adjusting bolt 24. Accordingly, it is expressly intended that all such equivalents, variations and changes therefrom which fall within the principle and scope of the present invention as described herein and defined in the claims be embraced thereby.

What is claimed is:

1. An adjustable flange comprising:
    a rigid circular collar portion having a base, said collar portion defining first and second openings therethrough;
    a gasket extending from and attached to said base, said gasket having an outer diameter which is smaller than an outer diameter of said collar portion, said gasket defining an opening coextensive with said first opening in said collar, said gasket being sized to fit around the circumference of a pipe; and
    adjusting means including band means encircling said gasket for applying compressive forces thereto, and tightening means extending along said gasket and through said second opening, said band means including a first band end and a second band end, said second band end being fixed to said gasket, said band means and said tightening means cooperating such that upon rotation of said tightening means, the forces applied by said band means are varied.

2. The adjustable flange of claim 1 wherein said band means includes a band having equally spaced slots through said band intermediate said first and second ends thereof and wherein said tightening means includes a member having teeth adapted to drivingly engage said slots.

3. The adjustable flange of claim 2 wherein said member is adapted to be rotated by a torque-limiting wrench.

4. The adjustable flange of claim 2 wherein said member is adapted to be rotated by a screwdriver.

5. The adjustable flange of claim 1 wherein said band means includes a band having a first gear attached thereto and wherein said tightening means includes a second gear for drivingly engaging said first gear.

6. The adjustable flange of claim 5 wherein said second gear is adapted to be rotated by a torque-limiting wrench.

7. The adjustable flange of claim 5 wherein said second gear is adapted to be rotated by a screwdriver.

8. The adjustable flange of claim 1 wherein said tightening means includes a spool adapted to wrap said first band end thereon.

9. The adjustable flange of claim 8 wherein said spool is adapted to be rotated by a torque-limiting wrench.

10. The adjustable flange of claim 8 wherein said spool is adapted to be rotated by a screwdriver.

11. An adjustable flange, comprising:
 a rigid collar portion having a base, said collar portion defining first and second openings therethrough;
 a gasket extending from and attached to said base, said gasket having an outer diameter which is smaller than an outer diameter of said collar portion, said gasket defining an opening coextensive with said first opening in said collar and being sized to fit around the circumference of a pipe;
 a band encircling said gasket for applying compressive force thereto, said band including a first end, a second end fixed to said gasket, and slots intermediate said first and second ends; and
 a rotatable member extending along said gasket and through said second opening, said member including teeth drivingly engaged with said slots such that rotation of said member varies said compressive force.

12. An adjustable flange, comprising:
 a rigid collar portion having a base, said collar portion defining first and second openings therethrough;
 a gasket extending from and attached to said base, said gasket having an outer diameter which is smaller than an outer diameter of said collar portion, said gasket defining an opening coextensive with said first opening in said collar and being sized to fit around the circumference of a pipe;
 a band encircling said gasket for applying compressive force thereto, said band including a first end, a second end fixed to said gasket, and slots intermediate said first and second ends;
 a screw member drivingly engaged with said slots, said screw member having a first gear thereon; and
 a rotatable member extending along said gasket and through said second opening, said member including a second gear drivingly engaged with said first gear such that rotation of said member varies said compressive force.

* * * * *